United States Patent [19]

Mills

[11] Patent Number: 4,607,154

[45] Date of Patent: Aug. 19, 1986

[54] ELECTRICAL HEATING APPARATUS PROTECTED AGAINST AN OVERHEATING CONDITION AND A TEMPERATURE SENSITIVE ELECTRICAL SENSOR FOR USE THEREWITH

[75] Inventor: Edwin R. Mills, Wake County, N.C.

[73] Assignee: Fieldcrest Mills, Inc., Eden, N.C.

[21] Appl. No.: 535,981

[22] Filed: Sep. 26, 1983

[51] Int. Cl.⁴ ............................................. H05B 1/02
[52] U.S. Cl. .................................... 219/505; 219/212; 219/509; 361/87; 361/188; 174/126 CP
[58] Field of Search ................ 219/504, 505, 508–510, 219/528, 547, 494, 212; 323/225; 361/87, 100, 124, 188, 190; 174/126 CP

[56] References Cited

U.S. PATENT DOCUMENTS

| | | | |
|---|---|---|---|
| 4,019,506 | 4/1977 | Eschmann | 128/91 A |
| 4,198,562 | 4/1980 | Mills et al. | 219/505 |
| 4,272,671 | 6/1981 | Hukagawa et al. | 219/505 |
| 4,315,141 | 2/1982 | Mills et al. | 219/510 |
| 4,381,789 | 5/1983 | Naser et al. | 128/798 |

Primary Examiner—M. H. Paschall
Attorney, Agent, or Firm—Bell, Seltzer, Park & Gibson

[57] ABSTRACT

An electrical heating apparatus protected against an overheating condition and a temperature sensitive electrical sensor for the use therewith are disclosed. The electrical heating apparatus includes an electrical heater for generating heat in proportion to the amount of electricity flowing through it, and it provides essentially all the heat for the apparatus. An electrical sensor is disposed in a thermally responsive relationship to the electrical heater. The electrical sensor includes a coextruded pair of spaced flexible plastic conductors and a coextruded flexible temperature sensitive electrical impedance material having predetermined temperature coefficient impedance characteristics along its entire length. The temperature sensitive material is in electrical contact with the flexible conductors and controls the flow of electricity between them. A control means associated with the electrical heater and the electrical sensor is responsive to a signal from the electrical sensor to control the electrical current flowing through the heater.

29 Claims, 8 Drawing Figures

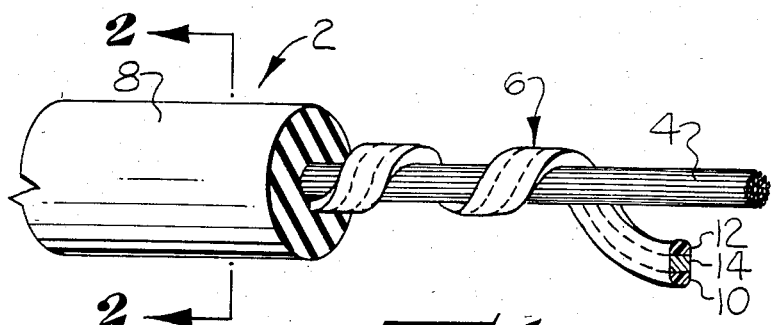
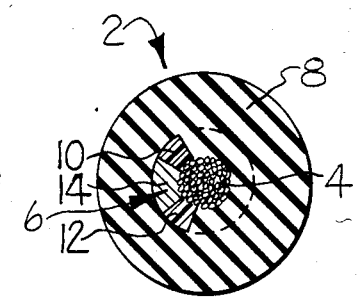
Fig-1  Fig-2
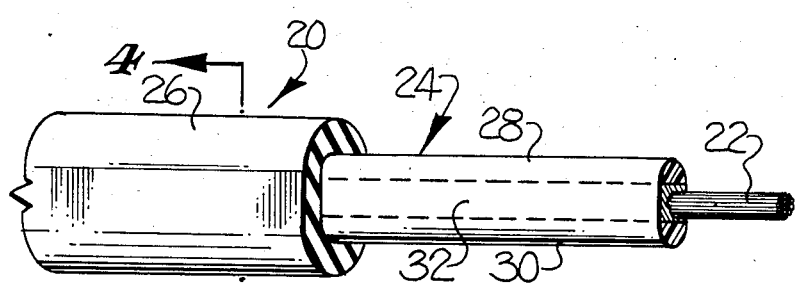
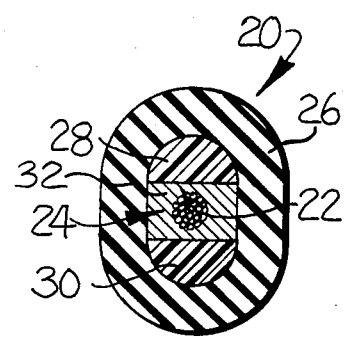
Fig-3  Fig-4
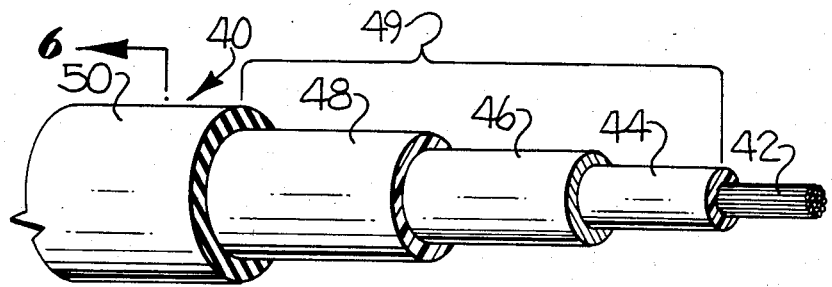
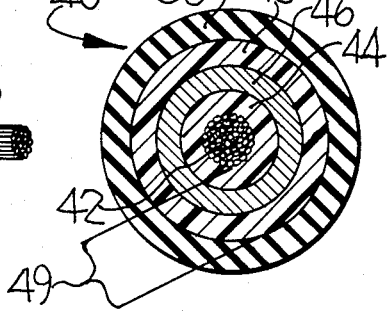
Fig-5  Fig-6
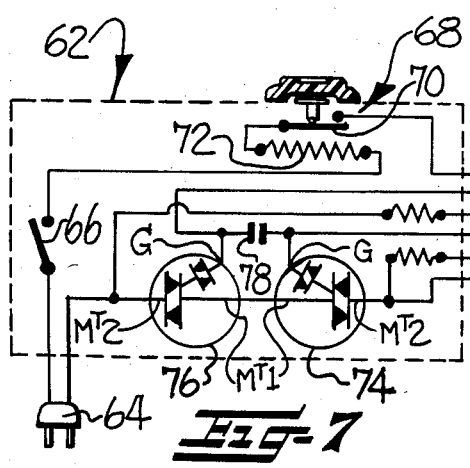
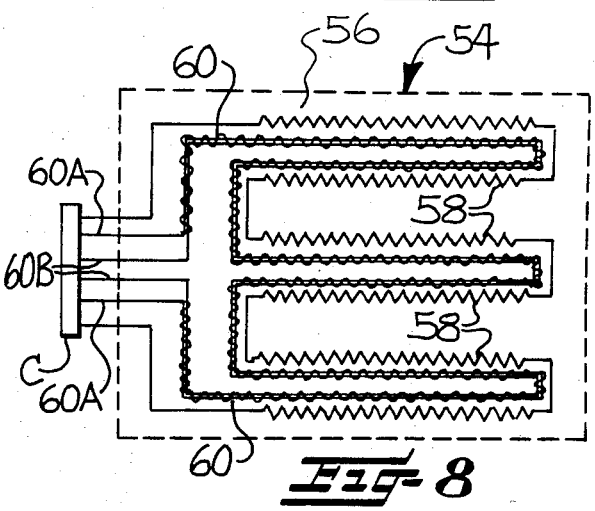
Fig-7  Fig-8

ELECTRICAL HEATING APPARATUS PROTECTED AGAINST AN OVERHEATING CONDITION AND A TEMPERATURE SENSITIVE ELECTRICAL SENSOR FOR USE THEREWITH

FIELD OF THE INVENTION

This invention relates to a temperature sensitive electrical sensor having a pair of spaced, plastic, flexible electrical conductors separated by a material having a temperature sensitive electrical impedance. Such a flexible, plastic, electrical sensor is compatible with personal comfort devices, such as electric blankets, or medical aids, such as heating pads.

BACKGROUND OF THE INVENTION

Electrically heated personal comfort or medical aid devices typically include an electrical heating means, such as a resistance heater wire, disposed between a pair of fabric covers. Heat is generated and supplied to the user when electrical energy or current flows through the heater wire. To guard against overheating a manually operated control is included to open the circuit providing electrical energy to the heater wire. However, it is also desirable to have a self monitoring temperature sensitive device that will control the flow of electrical current to the electrical heating means in the event that the user does not detect an overheating condition. Such a condition may result from the placement of a thermally insulating cover over the heating device, a bunching of the blanket, irregularities in the amount of electrical energy applied, or an electrical or mechanical malfunction. The overheating may be detrimental to the user and the materials adjacent to the heater wire. Thus, electrically heated covers typically include apparatus to sense an overheating condition and reduce or interrupt or otherwise control the flow of electrical current to the electrical heating means.

Typically, electric blankets, hot pads, heated socks and the like experience a degree of flexing, folding, bending and crumpling. Thus, the electrical heating means and electrical temperature sensor must also be capable of bending to accomodate such flexing. Metallic wire may permit some flexing or bending, but an excess will cause the metal to fatigue and break, resulting in an undesirable open circuit. Notwithstanding, most overheating detection circuits have utilized an electrical sensor having one or more metal conductors.

Two conductor prior art sensing wire is disclosed in U.S. Pat. Nos. 2,745,943, issued May 15, 1956, and 3,222,497, issued Dec. 7, 1965. Each has a central core surrounded by a helix of a first metallic electrical conductor. A temperature sensitive impedance material coaxially jackets the first conductor and central core, and a second metallic conductor is wrapped around the outer surface of the impedance material. An electrically insulating jacket coaxially encases the entire sensor wire. The resistivity of the impedance material varies inversely with temperature in a predetermined relationship, and is commonly referred to as NTC (negative temperature coefficient) material. Thus, any overheating may be detected by monitoring current flow therethrough. Such a sensor wire, although functional, requires multiple metallic conductors, and expensive raw materials and manufacturing equipment. It further requires a multistep and time consuming manufacturing process, including several wire wrap operations, which further adds to the cost thereof.

Another type of two wire sensor for use in thermostatless overheat protection circuits uses temperature sensitive dielectrics. Commonly assigned U.S. Pat. No. 3,683,151 issued Aug. 8, 1972, disclosed a sensor having a temperature sensitive dielectric between a pair of signal wires. A single gate controlled semiconductor switch responsive to the sensor reduces the energy delivered to a heating element in response to an overheating condition. Commonly assigned U.S. Pat. No. 4,315,141 issued Feb. 9, 1982 disclosed a sensor having a pair of conductors normally separated by a temperature sensitive dielectric. A pair of solid state switching devices are in series with the heating element circuit, and the gates thereof are electrically connected to the sensor. The switching devices are rendered nonconductive in response to an overheating condition. These circuits utilized relatively expensive sensors and control circuits, and included additional wires not found in the present invention, which may reduce their operational lifetime.

Other patents, such as U.S. Pat. No. 3,410,984 issued Nov. 12, 1968, disclosed electrically heated bedcovers with the heater wires themselves formed by a pair of resistance conductors separated by a layer of material having a positive temperature coefficient (PTC) of resistance. As the temperature of the PTC material increased, it expanded, increasing the impedance thereof, reducing current flow between the separated conductors, and reducing heat output. It did not include a discrete electrical sensor.

SUMMARY OF THE INVENTION

It is an object of the present invention to provide a temperature sensitive electrical sensor that is of continuous construction and economical to manufacture.

It is another object of the present invention to provide an electrical sensor for monitoring the temperature of a separate source of heat that includes a pair of flexible conductors comprised of electrically conductive plastic.

It is a further object of the present invention to provide an electrical heating apparatus protected against overheating that includes an improved electrical sensor for monitoring the heat generated by the electrical heating means.

It is a still further object of the present invention to provide an electrical heating apparatus protected against overheating that includes a temperature responsive electrical sensor having a pair of spaced flexible elongate conductors of electricity, the conductors comprised of electrically conductive plastic.

In accordance with this invention, an electrical sensor for monitoring the temperature of a separate source of heat and for providing an electrical signal in response to the monitored temperature comprises a pair of spaced flexible conductors comprised of electrically conductive plastic. A flexible temperature sensitive electrical impedance material having predetermined temperature coefficient impedance characteristics along its entire length is coextensive with and in electrical contact with the flexible conductors. The temperature sensitive material monitors the temperature along its length by controlling the flow of electricity between the flexible conductors.

The electrical heat sensor described may be used in a heating apparatus that includes an electrical heating means to provide essentially all of the heat for the apparatus, and a means for controlling the electrical current flowing through the heating means in response to a signal from the electrical sensor. It may further be used in an electric blanket or the like.

It is presently contemplated by the inventor that the sensor disclosed herein may be formed, at least in part, by conventional extrusion techniques and with conventional extrusion equipment. It is believed that this method of manufacture will produce a commercially acceptable sensor at a lower cost than is presently obtainable with conventional sensor wires by eliminating expensive wire-wrap operations. By using serial or coextrusion techniques one may be able to produce the entire sensor in one continuous operation.

BRIEF DESCRIPTION OF THE DRAWINGS

FIGS. 1, 3 and 5 are cut-away plan views of different embodiments of the temperature sensitive electrical sensor of the present invention.

FIGS. 2, 4 and 6 are end views of the temperature sensitive electrical sensor of the present invention taken, respectively, along the line 2—2 of FIG. 2, line 4—4 of FIG. 4, and line 6—6 of FIG. 6.

FIG. 7 is a schematic diagram of a controller for use with the temperature sensitive electrical sensor of the present invention.

FIG. 8 is a schematic diagram of an electric blanket including the temperature sensitive electrical sensor of the present invention.

DESCRIPTION OF THE INVENTION

Referring to FIGS. 1 and 2, a flexible temperature sensitive electrical sensor 2 includes a central core 4, a ribbon-like temperature sensitive conductor portion 6 wrapped in a helix around the core 4, and a jacket of electrical insulation 8 that encases the conductor portion 6 and core 4.

The central core 4 is a flexible electrically nonconductive material, such as a textile strand, which provides mechanical and tensile strength to the electrical sensor 2. The physical characteristics of the core 4 may be selected to limit the flexibility of the core, thereby avoiding any kinks or bends that might tend to break or knot the conductor portion 6.

The conductor portion 6 is of tripartite construction having a pair of spaced extruded electrical conductors 10, 12 separated by an extruded temperature sensitive electrical impedance material 14. Said conductors have a low or negligible electrical resistance and may be made of any of a number of known extrudable compounds, such as thermoplastic materials. Such materials are usually insulators, but they may be combined with selected materials which result in an electrically conductive material. For instance, ethylene vinyl acetate may be combined with suitable quantities of carbon black or metalized glass fibers or metalized flakes. Other examples are described in U.S. Pat. Nos. 3,243,753 and 3,591,526.

The temperature sensitive electrical impedance material 14 is in physical contact with said conductors 10, 12, and is sandwiched therebetween and coextensive therewith. The impedance material is also in electrical contact with the separated conductors to permit electrical flow therethrough between the conductors. The impedance or resistance level of the material 14 is temperature sensitive, thus, it varies with changes in temperature. Depending upon the specific composition of the impedance material 14, it is possible for the sensor to have a positive or negative temperature coefficient. By way of example, a suitable material for a negative temperature coefficient material may include a thermoplastic material to which an ionic compound has been added. The impedance of such a thermoplastic decreases as its temperature is elevated. Suitable thermoplastics include nylon, acrylonitrites, polyvinyl chloride and others. Such thermodynamically sensitive conductors are well known in the art and are described in, for example, U.S. Pat. Nos. 2,846,560; 3,222,497; 3,243,753; 3,793,716 and 3,861,029. Thus, by applying a voltage potential across the impedance material 14 by the two separated conductors, 10, 12, one may obtain a current flow that is proportional to the temperature of the impedance material 14.

It is desirable that the combination of the two conductors and sandwiched impedance material be flexible, so that they may be wrapped in a helix around the central core 4, as illustrated. Such flexibility also permits use of the sensor 2 where a flexible sensor is needed, as in an electric blanket or heating pad.

An electrical insulating jacket 8 coaxially surrounds the conductor portion 6. The thermodynamic properties of the insulating jacket 8 may vary as necessary to suit a particular application. For instance, if the sensor 2 is in close proximity to an electrical heating means, the insulation may have more thermodynamic resistance than if the two are more separated. The insulating jacket may also offer physical support or protection from abrasion, as desirable.

Referring to FIGS. 3 and 4, and using like numerals to designate like materials, a temperature sensitive electrical sensor 20 includes a central core 22, a tripartite temperature sensitive conductor portion 24, and an electrically insulating jacket 26. The central core 22 is a flexible, electrically nonconductive material, and it is centrally axially located within the sensor 20. The conductor portion 24 is of tripartite construction, having a pair of spaced electrical conductors 28, 30 separated by a temperature sensitive electrical impedance material 32 sandwiched therebetween. The properties of the conductors and impedance material are as described earlier. The impedance material may be coaxially extruded around the central core 22 and preferably adheres thereto to obtain longitudinal tensile strength. The electrically insulating jacket 26 coaxially surrounds the conductor portion 24. The junction between the impedance material 32 and the electrical conductors 28, 30 is shown as being planar, but it may be notched or grooved when viewed in cross section to aid in maintaining electrical and physical contact between the part by interlocking them.

Referring now to FIGS. 5 and 6, a coaxial temperature sensitive electrical sensor 40 is illustrated. A core 42 of a flexible, electrically nonconductive material is centrally, axially located. Moving radially outwardly, a first layer of plastic electrical conductor 44 is coaxially disposed onto the outer surface of the central core 42, by extrusion or the like. A layer of temperature sensitive electrical impedance material 46 is coaxially disposed onto the outer surface of the first conductor 44. A second layer of electrical conductor 48 is coaxially disposed onto the outer surface of the impedance material 46. The properties of the conductors and impedance material are as described earlier. The two conductors 44, 48 and the impedance material 46 together comprise the conductor portion 49. An electrically insulating layer 50 is coaxially disposed onto the outer surface of the conductor portion 49.

It is expected that most, if not all portions, of the sensor disclosed herein may be coextruded or serially extruded. This should result in physical attachment of each layer or portion to any physically adjoining layer or portion. This will result in unitary construction and enhanced physical strength. The extrusion process is well known in the art, and suitable equipment and techniques are also well known. Typically, pellets of a suitable thermoplastic material are heated to a consistency for extrusion. A preselected material, such as carbon, is added to the heated thermoplastic prior to extrusion from the die, which will result in a conductive compound or a temperature sensitive impedance compound. The different compounds may be coextruded, depending upon their extrusion characteristics and physical properties, or they may be serially extruded, or they may be extruded onto a substrate or core. The electrical and physical properties of the sensor may be varied as necessary through a suitable selection of raw materials.

Referring to FIGS. 7 and 8, an electrical heating apparatus 54, such as an electrically heated blanket, includes an envelope 56, an electrical heating means 58, a temperature sensitive electrical sensor 60, and a control means 62. This illustrates how an NTC electrical sensor may be used.

The envelope 56 may be fabric, plastic, or any other material that is suitable for use with an electrical heating means. It may include channels or tunnels (not shown) to contain or position the electrical heating means 58 or electrical sensor 60, or it may be comprised of two layers laminated or stitched together, as necessary or desirable. The ends of the heating means 58 and the sensing means 60 terminate in a six wire connector C that couples the controller to the blanket. As noted earlier the electrical sensor includes two plastic conductors 60A and 60B separated by a suitable temperature sensitive electrical impedance material.

Referring to FIG. 7, the controller includes a plug 64 for insertion into a standard wall outlet. A manually operable switch 66 is in series with the plug and may be operated by the user as a master on-off switch. A temperature control 68 is in series with the switch 66 and includes a bimetallic leaf switch 70 and a compensating heater 72. An alternate temperature controller is disclosed in U.S. Pat. No. 3,588,446. The heating means 58 is next in series and leads to the semiconductor switches 74, 76.

The gate controlled bidirectional semiconductor switches 74, 76 of the present invention are of the type which have been identified by the term "quadrac" and are available from various manufacturers. The quadrac is a bistable semiconductor device triggered through an integral diac and which can block voltage in either direction, conduct current in either direction, and be triggered for conducting current in either direction by the application of gate signals. The basic switch structure typically includes a terminal $MT_1$ and an adjacent gate terminal G located on one side of the device, and a terminal $MT_2$ on the opposite side. The region of the semiconductor between the terminals $MT_1$ and $MT_2$ is in the form of a pair of parallel semiconductor switches. The gate terminal is indicated by a line emanating from the $MT_1$ side of the schematic symbol and including, within the envelope of the device, complementary triangular symbols indicating the diac or diode characteristic of the gate portion of the device. Terminal $MT_1$ is the reference point for measurement of voltages and currents at the gate terminal G and at the opposite terminal $MT_2$. The $MT_1$ terminal side of the switch is often regarded as the "front" of the device and the $MT_2$ terminal side of the quadrac is regarded as the "back" of the device. For ease of understanding, this terminology is used in the present description and claims in order to specify the interconnection of the pair of switches.

In particular, it will be noted that the pair of gate controlled bidirectional semiconductor switches provided in accordance with the present invention are electrically connected to one another in series and in front-to-front orientation. That is, the $MT_1$ terminal sides of the devices are directly joined, and the $MT_2$ terminal sides serving to connect the switches 74, 76 in series relation with the electrical resistance heating element 58 and the temperature control 68.

In order to accomplish overheat protection in accordance with the present invention, means are provided which electrically connect the respective gates G of the switches 74, 76 to one another through the electrical sensor 60. Resistances and a capacitor 78 are included as necessary to suitably bias the network.

During normal operation, because of the coupling through the sensor wire conductors 60A, 60B gate signals pass to the switches 74, 76 and trigger the devices in phase relation with the cycles of alternating electrical current applied such that substantially full cycles of alternating electrical current are conducted to the electrical heating means 58. When an overheating condition occurs, however, a decrease in impedance of the temperature sensitive impedance material of the sensor wire 60 reduces gate signals to a level below that sufficient to trigger the switches into a conductive state. Consequently, the switches 74, 76 become nonconductive and interrupt the flow of current to the heating device.

In the event that either of the switches 74, 76 should fail in an open or nonconducting state, the circuit enters a condition in which no current is conducted to the heating element 58. Should one switch fail in a shorted or conductive state, the other switch will not become conductive because no gate signal will be available. This result also follows from the cross over connection of the gate circuits. That is, the gate G for switch 76 is connected to the "back" terminal $MT_2$ of switch 74, and the gate G for switch 74 is connected to the "back" terminal $MT_2$ of switch 76.

As with the alternate embodiments disclosed herein, it is apparent that this invention is capable of various modifications. Accordingly, while the invention disclosed herein has been described with reference to a preferred embodiment, it is to be understood that this disclosure is to be interpreted in its broadest sense and encompass the use of equivalent apparatus and configurations.

That which is claimed is:

1. An electrical heating apparatus protected against an overheating condition and comprising
an electrical heating means for generating heat in proportion to the amount of electrical current flowing therethrough, said heating means providing essentially all of the heat for the apparatus;
an electrical sensor in a thermally responsive relationship with respect to said electrical heating means for monitoring the heat generated by said electrical heating means and for providing a signal in response to an overheating condition, said electrical sensor comprising a coextruded pair of spaced parallel flexible elongate conductors of electricity, said flexible conductors comprised of electrically conductive plastic, and a flexible elongate temperature sensitive electrical impedance material having predetermined temperature coefficient impedance characteristics along its entire length, said temperature sensitive material being coextruded parallel and coextensive with and in electrical contact with said flexible conductors along the length of said flexible conductors for monitoring the temperature at any point along the length of said temperature sensitive material by controlling the flow of electricity between said flexible conductors; and control means associated with said electrical heating means and said electrical sensor for controlling the electrical current flowing through said electrical heating means in response to a predetermined signal from said electrical sensor.

2. The apparatus of claim 1 wherein said control means comprises semiconductor switch means electrically connected in series with said electrical heating means.

3. The apparatus of claim 1 wherein said control means comprises gate controlled semiconductor means having terminals electrically connected in series with said electrical heating means and gate terminals electrically connected to said electrical sensor.

4. The apparatus of claim 1 wherein said temperature sensitive electrical impedance material has negative temperature coefficient resistance characteristics, and said control means comprises a pair of gate controlled bidirectional semiconductor switches connected to one another in series, means connecting said pair of semiconductor switches in series to said electrical heating means for permitting either one to control the electrical current flowing through said electrical heating means, and means electrically connecting the gate of each of said semiconductor switches to a terminal of said same semiconductor switch through said electrical sensor for triggering the semiconductor switches in response to the sensing of an overheating condition.

5. The apparatus of claim 1 wherein said electrical heating means and said electrical sensor are substantially coextensive.

6. The apparatus of claim 4 wherein said pair of semiconductor switches are connected in front-to-front (MT$_1$ to MT$_1$) relation.

7. An electrically heated bed cover protected against an overheating condition and comprising
 a bedcover;
 an electrical heating means in said bedcover for generating heat in proportion to the amount of electrical current flowing therethrough, said heating means providing essentially all of the heat for the bedcover;
 an electrical sensor in a thermally responsive relationship with respect to said electrical heating means for monitoring the heat generated by said electrical heating means and for providing a signal in response to an overheating condition, said electrical sensor comprising a coextruded pair of spaced parallel flexible elongate conductors of electricity, said flexible conductors comprised of electrically conductive plastic, and a flexible elongate temperature sensitive electrical impedance material having predetermined temperature coefficient impedance characteristics along its entire length, said temperature sensitive material being coextruded parallel and coextensive with and in electrical contact with said flexible conductors along the length of said flexible conductors for monitoring the temperature at any point along the length of said temperature sensitive material by controlling the flow of electricity between said flexible conductors; and control means for controlling the electrical current flowing through said electrical heating means in response to a predetermined signal from said electrical sensor.

8. The apparatus of claim 7 wherein said control means comprises semiconductor switch means electrically connected in series with said electrical heating means.

9. The apparatus of claim 7 wherein said control means comprises gate controlled semiconductor means having terminals electrically connected in series with said electrical heating means and gate terminals electrically connected to said electrical sensor.

10. The apparatus of claim 8 wherein said temperature sensitive electrical impedance material has negative temperature coefficient resistance characteristics, and said control means comprises a pair of gate controlled bidirectional semiconductor switches connected to one another in series, means connecting said pair of semiconductor switches in series to said electrical heating means for permitting either one to control the electrical current flowing through said electrical heating means, and means electrically connecting the gate of each of said semiconductor switches to a terminal of said same semiconductor switch through said electrical sensor for triggering the semiconductor switches in response to the sensing of an overheating condition.

11. The apparatus of claim 8 wherein said electrical heating means and said electrical sensor are substantially coextensive.

12. The apparatus of claim 10 wherein said pair of semiconductor switches are connected in front-to-front (MT$_1$ to MT$_1$) relation.

13. An electrical sensor for monitoring the temperature of a separate source of heat and for providing an electrical signal in response to the monitored temperature, said sensor comprising a coextruded pair of spaced parallel flexible elongate conductors of electricity, said flexible conductors comprised of electrically conductive plastic; and
 a flexible elongate temperature sensitive electrical impedance material having predetermined temperature coefficient impedance characteristic along its entire length, said temperature sensitive material being coextruded parallel and coextensive with and in electrical contact with said flexible conductors along the length of said flexible conductors for monitoring the temperature at any point along the length of said temperature sensitive material by controlling the flow of electricity between said flexible conductors.

14. An electrical sensor as in claim 13 wherein said flexible conductors comprise a thermoplastic compound having added thereto electrically conductive material.

15. An electrical sensor as in claim 13 wherein said flexible conductors are coaxially disposed.

16. An electrical sensor as in claim 13 wherein said temperature sensitive material is in intimate physical contact between said flexible conductors along the length of said flexible conductors.

17. An electrical sensor as in claim 13 wherein said flexible conductors and said temperature sensitive material together comprise a unitary strand.

18. An electrical sensor as in claim 13 wherein said temperature sensitive material has negative temperature impedance characteristics whereby an increase in temperature results in a decrease in impedance.

19. An electrical sensor as in claim 13 wherein said plastic of said temperature sensitive material comprises a thermoplastic compound.

20. An electrical sensor as in claim 13 wherein said electrical sensor further comprises a jacket encasing both said flexible conductors and said temperature sensitive material to form a unitary strand.

21. An electrical sensor for monitoring the temperature of a separate source of heat and for providing an electrical signal in response to the monitored temperature, said sensor being a single strand and comprising
a coextruded pair of spaced parallel flexible elongate conductors of electricity, said flexible conductors comprising a thermoplastic compound having electrically conductive material incorporated therein so that said flexible conductors have a low resistivity to the conduction of electricity; and
a flexible elongate temperature sensitive electrical impedance material having predetermined temperature coefficient impedance characteristics along its entire length, said temperature sensitive material being coextruded paralled and coextensive with and in intimate physical and electrical contact between said flexible conductors along the length of said flexible conductors for monitoring the temperature at any point along the length of said temperature sensitive material by controlling the flow of electricity between said flexible conductors.

22. An electrical sensor as in claim 21 wherein said flexible conductors are coaxially disposed.

23. An electrical sensor as in claim 21 wherein said temperature sensitive material has negative temperature impedance characteristics whereby an increase in temperature results in decrease in impedance.

24. An electrical sensor as in claim 22 wherein said electrical sensor further comprises a jacket encasing both said flexible conductors and said temperature sensitive material.

25. An electrical sensor for monitoring the temperature of a separate source of heat and for providing an electrical signal in response to the monitored temperature, said sensor being a single strand and comprising
an elongate core of electrically insulating flexible material having predetermined mechanical properties;
an elongate conductor portion having at least a portion thereof in physical contact with said core, said conductor portion comprising a coextruded pair of spaced parallel flexible elongate conductors of electricity, said flexible conductors comprised of electrically conductive plastic, and a flexible elongate temperature sensitive electrical impedance material having predetermined temperature coefficient impedance characteristics along its entire length, said temperature sensitive material being coextruded parallel and coextensive with and in electrical contact with said flexible conductors along the length of said flexible conductors for monitoring the temperature at any point along the length of said temperature sensitive material by controlling the flow of electricity between said flexible conductors; and
a jacket for encasing both said elongate conductor portion and said core to form a unitary strand.

26. An electrical sensor as in claim 25 wherein said core comprises a textile material that is substantially nonextensible.

27. An electrical sensor as in claim 25 wherein said elongate conductor portion is wrapped around the exterior of said core in a helix.

28. An electrical sensor as in claim 25 wherein said core is embedded within and is coextensive with said elongate conductor portion.

29. An electrical sensor as in claim 25 wherein said core, both of said flexible conductors, said temperature sensitive material, and said jacket are all coaxially disposed.

* * * * *

UNITED STATES PATENT AND TRADEMARK OFFICE
CERTIFICATE OF CORRECTION

PATENT NO. : 4,607,154

DATED : August 19, 1986

INVENTOR(S) : Edwin R. Mills

It is certified that error appears in the above-identified patent and that said Letters Patent is hereby corrected as shown below:

Column 4, Line 52, "part" should be --parts--.

Column 6, Line 43, "cross over" should be in quotes as --"cross over"--.

Column 9, Line 29, "coextruded paralled" should be --coextruded, parallel--.

Column 10, Line 21, "coextruded parallel" should be --coextruded, parallel--.

Signed and Sealed this

Twenty-eighth Day of October, 1986

[SEAL]

Attest:

DONALD J. QUIGG

Attesting Officer     Commissioner of Patents and Trademarks